(12) United States Patent
Eychenne-Baron et al.

(10) Patent No.: US 7,758,692 B2
(45) Date of Patent: Jul. 20, 2010

(54) PIGMENT SUSPENSION HAVING IMPROVED COLOR STRENGTH

(75) Inventors: Christophe Eychenne-Baron, Bourg-la-Reine (FR); Olivier Malbault, Avon (FR); Jean-Jacques Hivert, Mareau aux Bois (FR)

(73) Assignee: Chryso, Issey les Moulineaux (FR)

( * ) Notice: Subject to any disclaimer, the term of this patent is extended or adjusted under 35 U.S.C. 154(b) by 5 days.

(21) Appl. No.: 12/052,570

(22) Filed: Mar. 20, 2008

(65) Prior Publication Data

US 2008/0229977 A1 Sep. 25, 2008

(30) Foreign Application Priority Data

Mar. 21, 2007 (FR) .................................. 07 53955

(51) Int. Cl.
| | |
|---|---|
| C09C 3/10 | (2006.01) |
| C09C 1/22 | (2006.01) |
| C09C 1/24 | (2006.01) |
| C08K 5/00 | (2006.01) |
| C08F 220/28 | (2006.01) |
| C01G 49/02 | (2006.01) |
| C04B 103/54 | (2006.01) |

(52) U.S. Cl. ..................... 106/499; 106/447; 106/453; 106/460; 106/476; 106/480; 106/505

(58) Field of Classification Search ................. 106/460, 106/499, 447, 453, 476, 480, 505
See application file for complete search history.

(56) References Cited

U.S. PATENT DOCUMENTS

| 5,349,036 A | 9/1994 | Simpson et al. |
| 6,596,816 B1 | 7/2003 | Haubennestel et al. |
| 2007/0022914 A1 | 2/2007 | Friedrich et al. |

FOREIGN PATENT DOCUMENTS

| EP | 0567214 A1 | 10/1993 |
| JP | 2001-31885 A * | 2/2001 |

* cited by examiner

*Primary Examiner*—Anthony J Green
(74) *Attorney, Agent, or Firm*—Barnes & Thornburg LLP

(57) ABSTRACT

The invention relates in particular to an aqueous pigment suspension comprising at least one polymer of the type polycarboxylate grafted by alkylene polyoxide chains. It relates in addition to the use thereof especially in the coloring of hydraulic set materials.

10 Claims, No Drawings

PIGMENT SUSPENSION HAVING IMPROVED COLOR STRENGTH

CROSS REFERENCE TO RELATED APPLICATIONS

This application claims priority to French application no. 07 53955, filed Mar. 21, 2007, which is incorporated herein by reference in its entirety.

The present invention relates to the use of dispersing agents of the alkylene polyoxide polycarboxylate (PCP) type for improving the color strength of pigment suspensions, and to the pigment suspensions so obtained.

BACKGROUND TO THE INVENTION

A pigment suspension generally comprises a solvent, usually water, pigments and, optionally, a plasticiser for reducing the viscosity and/or increasing the pigment concentration thereof.

The color strength is an essential property of pigment compositions. It defines the amount of pigment composition necessary to obtain a desired color shade.

For the majority of applications it is preferred to have a pigment suspension with a high color strength. Not only does this represent an economic factor; the material added to the composition to be colored is also limited. The latter factor is particularly important for hydraulically setting materials, the optimized formulation of which can be very sensitive to the presence of ions.

US patent application 2007/0022914 proposes adding partially or fully hydrolysed polyvinyl alcohols or sulfur- or phosphorus-containing compounds to pigment suspensions in order to improve the color strength thereof.

Such compounds are not satisfactory, however.

Patent application EP 0 567 214 describes the use of a copolymer obtained by polymerization of methacrylic acid, methacrylates and styrene as a pigment dispersing agent.

However, such compounds can sometimes pose problems owing to their residual monomer content. In addition, the hydrophobic nature limits their absorption at the surface of the polar pigment particles and accordingly their dispersion capacity.

SUMMARY OF THE INVENTION

Accordingly, the object of the present invention was to propose a pigment suspension having improved color strength.

The object is achieved by adding a polymer of the alkylene polyoxide polycarboxylate (PCP) type to the pigment suspension.

Therefore, according to a first aspect, the invention relates to an aqueous pigment suspension comprising at least one polymer of the type polycarboxylate grafted by alkylene polyoxide chains.

Without wishing to be bound by any particular theory, it is assumed that this unexpected effect is based especially on a dispersing action of the alkylene polyoxide polycarboxylate, by virtue of which it is possible to prevent the agglomeration of the pigment particles. There is then obtained a pigment suspension comprising pigment particles of a size centred on a particle size distribution which allows the color strength to be maximized.

The pigment suspensions are generally aqueous dispersions. However, the suspension can, where appropriate, also comprise one or more other water-miscible solvents in lesser amounts.

The term "pigment" is understood as meaning coloring compounds that are insoluble in the chosen solvent. They are generally mainly mineral compounds, especially metal oxides and/or hydroxides. Particular mention may be made of iron oxides, chromium oxides, titanium oxides, cobalt blue, mixed metal oxides and carbon black. Particularly preferred pigments are iron oxides.

Among those pigments, very particular preference is given to those which are used for coloring building materials such as cement, mortar, concrete and plaster. Such pigments are marketed, for example, by Lanxess under the name Bayferrox 420, Bayferrox 110 and Bayferrox 330, corresponding to the colors yellow, red and black, respectively.

The suspension can, of course, comprise one or more different pigments.

The pigment suspension generally has a content of from 30 to 90% by weight, preferably from 40 to 70% by weight and very particularly from 50 to 60% by weight of pigment, based on the total suspension.

According to the invention, the pigment suspension additionally comprises one or more polymers of the type polycarboxylate grafted by alkylene polyoxide chains. The term "alkylene polyoxide polycarboxylate" is understood as meaning comb copolymers having a polycarboxylate main chain carrying grafted side chains of alkylene polyoxide. Such polymers are often called by the abbreviation PCP. They are known as so-called superplasticizing dispersing agents and are available commercially, especially from CHRYSO (for example CHRYSO®Fluid Optima 200, CHRYSO®Fluid Optima 206).

The alkylene polyoxide polycarboxylates (PCP) can be prepared especially by esterification of a (meth)acrylic polyacid with an alkoxypolyalkylene glycol. Application FR 2 776 285 describes the preparation of alkylene polyoxide polycarboxylates by partial esterification of a polycarboxylic acid with a polyether.

The alkylene polyoxide polycarboxylate is preferably derived from polymethacrylic acid.

It is additionally preferred for the alkylene polyoxide polycarboxylate to comprise units derived from methoxypolyethylene glycol.

Finally, it is particularly preferred for the alkylene polyoxide polycarboxylate to comprise units derived from methoxypolyethylene glycol having a molar mass of from 350 to 5000 D, very particularly from 1000 to 3000 D.

It is found that a very small amount of alkylene polyoxide polycarboxylate, of the order of 0.05% by weight, based on the weight of pigment, may already be sufficient to effect a notable improvement in the color strength.

Beyond an amount of 25% by weight, however, no further notable changes are generally found.

Therefore, the pigment suspensions according to the invention comprise preferably from 0.05 to 25% by weight, preferably from 0.15 to 15% by weight and very particularly from 0.2 to 0.7% by weight of alkylene polyoxide polycarboxylate, based on the weight of the pigments.

Preferably, the pigment suspension further comprises from 0.01 to 10% by weight, preferably from 0.01 to 5% by weight and very particularly from 0.05 to 1% by weight of at least one stabilizing agent, based on the weight of pigment.

Advantageously, the pigment suspension additionally comprises from 0.01 to 10% by weight of at least one antifoaming agent.

Among the known stabilizing agents, particular mention may be made of polysaccharides, gums, and especially xanthan.

According to another aspect, the invention relates to the use of an alkylene polyoxide polycarboxylate for improving the color strength of a pigment suspension.

In order to facilitate its addition, the alkylene polyoxide polycarboxylate used to improve the color strength of the pigment suspension can be formulated in liquid form, especially in the form of an aqueous solution.

In general, the formulation has a content of from 10 to 60% by weight, preferably from 20 to 40% by weight and very particularly from 25 to 35% by weight of dry extract of alkylene polyoxide polycarboxylate.

Advantageously, the formulation additionally comprises other agents, especially one or more anti-foaming agents.

Preferably, the pH of the formulation is adjusted to a neutral pH using a suitable agent. Such neutralizing agents can be selected especially from sodium hydroxide, aminomethyl propanol and triethanolamine.

The pigment suspensions formulated with an alkylene polyoxide polycarboxylate can be intended especially for the coloring of hydraulic set materials and in particular cement and plaster.

Within that context, the pigment suspension can be used in the conventional manner. It can especially be added before, after or together with the mixing water.

DETAILED DESCRIPTION OF THE INVENTION

The invention will be described in greater detail hereinbelow by means of examples. Unless indicated otherwise, the percentages given are to be understood as being by weight, based on the total composition.

Examples

A. Synthesis of the Polymer

Product A 42.82 g of polymethacrylic acid (Mw=4000) are introduced into a suitable container equipped with a heating means and mechanical stirring, and the heating is set to 60° C. 0.40 g of sodium hydroxide (50% NaOH) is then introduced, and it is ensured that the reaction mixture is homogeneous.

56.78 g of methoxypolyethylene glycol (Polyglycol M 2000) are then introduced, with continued stirring. A vacuum (−0.8 bar) is applied, and the heating is set to 100° C. When the water starts to distil, and as the temperature rises, the heating is gradually increased to 175° C.

When the temperature has reached 175° C., heating is continued for a further 4 hours. The reaction is stopped by removing the vacuum and stopping heating, when the methoxypolyethylene glycol content, measured by size exclusion chromatography, is less than 2%.

The polymer so obtained has an ester number of 20. It is anhydrous and handleable at a temperature of 50° C. It is preferably used without further purification.

Table 1 below summarizes the proportions of raw materials employed in the preparation of product A.

TABLE 1

| Product | PMA [%] | MPEG 2000 [%] | NaOH [%] | Ester number |
|---|---|---|---|---|
| A | 42.82 | 56.78 | 0.40 | 20 |

B. Formulation of the Polymer

Formulation B

Polymer A obtained as indicated above is formulated to 30% dry extract and by incorporating 0.23% of an antifoaming agent 1 and 0.02% of an antifoaming agent 2. The pH is adjusted to pH 7 by means of a neutralizing base (sodium hydroxide).

Table 2 below summarizes formulation B.

TABLE 2

| Formulation | Product A [%] | Antifoam 1 [%] | Antifoam 2 [%] | NaOH [%] | Water |
|---|---|---|---|---|---|
| B | 30 | 0.23 | 0.02 | to pH 7 | qsp |

PMA: Polymethacrylic acid, 30% dry extract, Mw=4000, acid number=180 mg KOH/g

MPEG 2000: Polyglycol M 2000

Example 1

Reference J

Preparation of a Yellow Pigment Suspension

In a RW 20 n Rayneri mixer (distributed by IKA) equipped with a deflocculating blade of the type having a diameter of 4 cm, 400 g of iron oxide suspension were prepared as follows.

195.2 g of water, 4.0 g of formulation B obtained as indicated above and 200 g of yellow pigment (Bayferrox 420 from Lanxess) were introduced in that order, and stirring is carried out for 10 minutes at a rate of 2000 rpm. 0.8 g of xanthan is then introduced as stabilizing agent, and stirring is continued for a further 5 minutes at a rate of 2000 rpm.

Comparison Example 1

Reference RJ

Preparation of a Yellow Pigment Suspension

Example 1 is repeated, except that formulation B is replaced by 4.0 g of Sokalan CP10 from BASF (polyacrylic acid solution).

Example 2

Reference N

Preparation of a Black Pigment Suspension

In a RW 20 n Rayneri mixer (distributed by IKA) equipped with a deflocculating blade having a diameter of 4 cm, 400 g of iron oxide suspension were prepared as follows.

197.4 g of water, 2.0 g of formulation B obtained as indicated above and 200 g of black pigment (Bayferrox 330 from Lanxess) were introduced in that order, and stirring is carried out for 10 minutes at a rate of 2000 rpm. 0.6 g of xanthan is then introduced as stabilizing agent, and stirring is continued for a further 5 minutes at a rate of 2000 rpm.

Comparison Example 2

Reference RN

Preparation of a Black Pigment Suspension

Example 2 is repeated, except that formulation B is replaced by 2.0 g of Sokalan CP10 from BASF (polyacrylic acid solution).

Example 3

Reference R

Preparation of a Red Pigment Suspension

In a RW 20 n Rayneri mixer (distributed by IKA) equipped with a deflocculating blade having a diameter of 4 cm, 400 g of iron oxide suspension were prepared as follows.

157.8 g of water, 1.6 g of formulation B obtained as indicated above and 240 g of red pigment (Bayferrox 110 from Lanxess) were introduced in that order, and stirring is carried out for 10 minutes at a rate of 2000 rpm. 0.6 g of xanthan is then introduced as stabilizing agent, and stirring is continued for a further 5 minutes at a rate of 2000 rpm.

Comparison Example 3

Reference RR

Preparation of a Red Pigment Suspension

Example 3 is repeated, except that formulation B is replaced by 1.6 g of Sokalan CP10 from BASF (polyacrylic acid solution).

The relative proportions of the components of the pigment suspensions prepared according to the above examples are summarized in the table below.

TABLE 3

Formulation of the pigment suspensions

| Reference | Water [%] | Formulation B [%] | PAA [%] | Pigment 1 [%] | Pigment 2 [%] | Pigment 3 [%] | Xanthan [%] |
|---|---|---|---|---|---|---|---|
| J | 48.8 | 1.0 | 0 | 50 | 0 | 0 | 0.2 |
| RJ | 48.8 | 0 | 1.0 | 50 | 0 | 0 | 0.2 |
| N | 49.35 | 0.5 | 0 | 0 | 50 | 0 | 0.15 |
| RN | 49.35 | 0 | 0.5 | 0 | 50 | 0 | 0.15 |
| R | 39.45 | 0.4 | 0 | 0 | 0 | 60 | 0.15 |
| RR | 39.45 | 0 | 0.4 | 0 | 0 | 60 | 0.15 |

PAA = Sokalan CP10 from BASF or LOPON 890 from BK Giulini
Pigment 1 = Bayferrox 420
Pigment 2 = Bayferrox 330
Pigment 3 = Bayferrox 110

Example 4

Evaluation of the Color on Mortar

In order to evaluate the color strength of the prepared pigment suspensions, mortars were prepared by incorporating the pigment suspensions at the step of producing the dry mortar which will be used to produce dry mortar blocks using a hydraulic press.

A dry mortar according to the formula indicated in Table 4 below was therefore first produced as follows.

1250 g of AFNOR sand and 350 g of cement (HTS Superblanc du Teil CP2 52.5 N) are introduced into a 3-liter stainless steel bowl of a mixer (of the Power Mix type distributed by Krups) equipped with a whip-type stirrer blade, and stirring is carried out for 30 seconds at power 3. An amount equivalent to 3 g of dry matter of the suspension of reference J, RJ, N, RN, R or RR and 102 g of water are then introduced in a period of 30 seconds, and stirring is continued for a further 4 minutes.

The mortar has a ratio $E_{effective}/L_{equivalent}$ of 0.29.

TABLE 4

Formulation of the mortar

| | |
|---|---|
| Cement HTS Superblanc du Teil CP2 52.5N | 350 g |
| AFNOR sand | 1250 g |
| Suspension of formula J, RJ, N, RN, R or RR | 3 g of dry material |
| Water | 102 g |

A mortar block is then produced from that mortar, as follows. 500 g of colored mortar are introduced into a mould of dimensions 7×12×3 cm, and then pressing is carried out in a hydraulic press at 130 bar for 10 seconds. The block is removed from the mould and left under an ambient atmosphere for one week.

The coloring of the mortar block so obtained is evaluated as follows.

7 days after production of the mortar, calorimetric measurements are carried out by means of a Minolta CR 310 calorimeter at the surface of the mortar block in three different locations without efflorescence. The average of those three measurements is recorded in Table 5 below.

TABLE 5

Colorimetric measurements

| Reference | L | a | B | C* = saturation |
|---|---|---|---|---|
| N | 30.77 | 0.69 | 0.80 | 1.06 |
| RN | 32.09 | 0.70 | 0.81 | 1.07 |
| J | 52.80 | 3.17 | 29.11 | 29.28 |
| RJ | 53.87 | 2.89 | 27.51 | 27.66 |
| R | 39.07 | 18.17 | 15.73 | 24.04 |
| RR | 40.44 | 17.25 | 15.11 | 22.93 |

A comparison of the colorimetry values recorded for the blocks of the examples referenced N and RN shows that the coefficients a and b are almost identical, while the clarity (parameter L) is lower for the block colored with formula N as compared with that colored with formula RN.

These results show that the nature of the dispersing agent used in the formulation of a pigment suspension is significant. More precisely, those results demonstrate the improvement in the color strength of a pigment suspension intended for coloring a dry mortar when the latter is formulated with an alkylene polyoxide polycarboxylate rather than with a polyacrylic acid.

The gain in color strength is estimated at 4.0% ($L_{RN}-L_N/L_{RN}$).

A comparison of the colorimetry values recorded for the blocks colored with suspension J and RJ shows that the block colored with formula J has values for b and saturation which are higher than those of the block colored with formula RJ.

It is deduced that the color observed on the block colored with formula J is deeper than that observed on the block colored with formula RJ.

This result shows the value of formulating a pigment suspension with alkylene polyoxide polycarboxylate rather than with a polyacrylic acid, the estimated gain in color strength is accordingly 2.0% ($S_{RJ}-S_J/S_{RJ}$).

A comparison of the colorimetry values recorded for the blocks colored with suspension R and RR shows a difference in the coefficient a and in the saturation value L.

Those values are accordingly higher for the mortar block colored with formula R than those of the block colored with formula RR characteristic of a deeper color. This result shows the gain in color strength effected by the use of alkylene polyoxide polycarboxylate rather than a polyacrylic acid.

For this test, the gain in color strength was estimated at 4.81% ($S_{RN}-S_R/S_{RN}$).

What is claimed is:

1. Aqueous pigment suspension comprising at least one alkylene polyoxide polycarboxylate, wherein said alkylene polyoxide polycarboxylate is a comb-copolymer having a polycarboxylate main chain carrying grafted side chains of alkylene polyoxide.

2. Pigment suspension according to claim 1, in which the pigment is a metal oxide or hydroxide.

3. Pigment suspension according to claim 1, in which the pigment is an iron oxide.

4. Pigment suspension according to claim 1, in which the alkylene polyoxide polycarboxylate is derived from polymethacrylic acid.

5. Pigment suspension according to claim 1, in which the alkylene polyoxide polycarboxylate comprises units derived from methoxypolyethylene glycol.

6. Pigment suspension according to claim 5, in which the alkylene polyoxide polycarboxylate comprises units derived from methoxypolyethylene glycol having a molar mass of from 350 to 5000 D.

7. Pigment suspension according to claim 1, comprising from 0.05 to 25% by weight of alkylene polyoxide polycarboxylate, based on the weight of pigment.

8. Pigment suspension according to claim 1, comprising from 40 to 70% by weight pigment.

9. Pigment suspension according to claim 1, additionally comprising from 0.01 to 10% by weight of at least one anti-foaming agent.

10. Pigment suspension according to claim 1, additionally comprising from 0.01 to 10% by weight of at least one stabilizing agent.

* * * * *